Patented Apr. 18, 1939

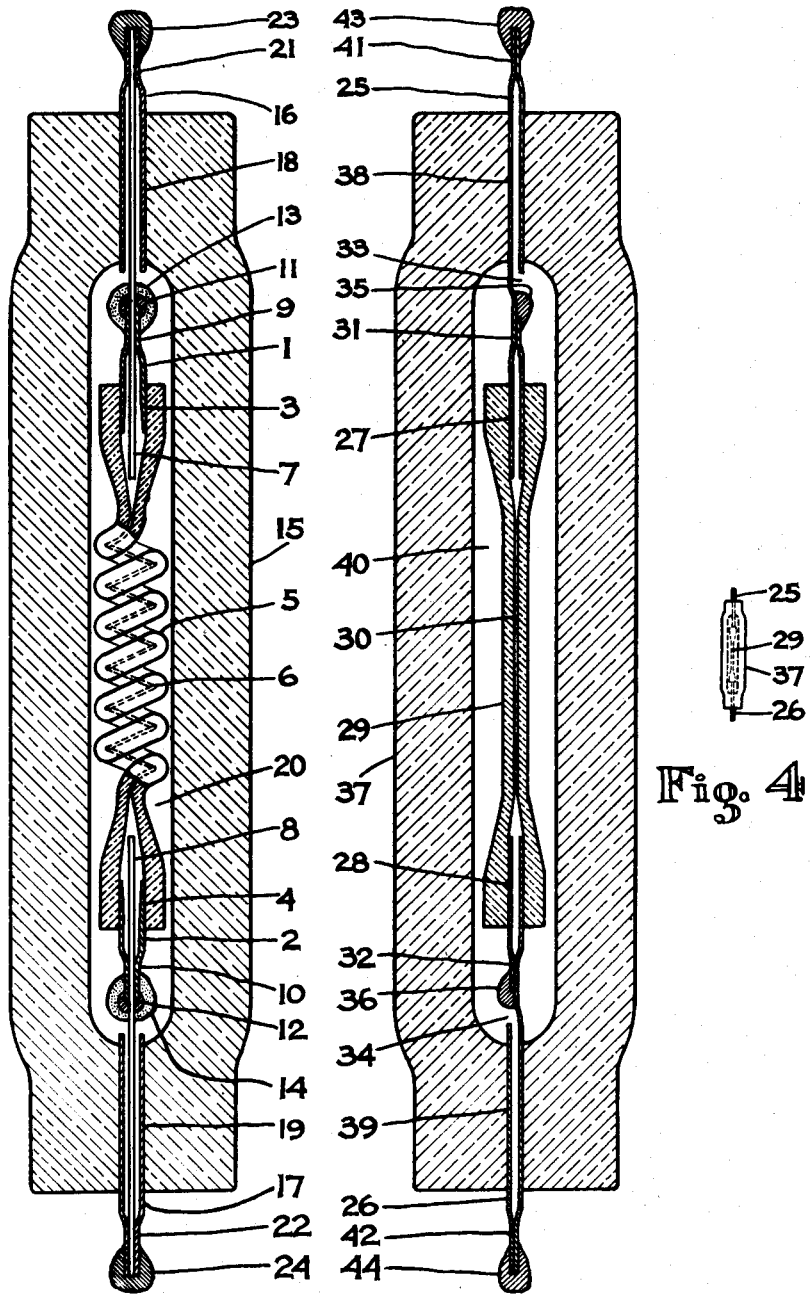

2,154,542

UNITED STATES PATENT OFFICE 2,154,542

ELECTRIC INCANDESCENT HIGH PRESSURE GAS METALLIC VAPOR LAMP

Harold Swanson, Cleveland, Ohio

Application February 15, 1938, Serial No. 190,615

9 Claims. (Cl. 176—122)

This invention relates to improvements that increase the lighting efficiency of electric incandescent lamps in which a metallic vapor filament within an inner glass capillary tube is surrounded by high pressure gas retained within an outer pressure restraining glass bulb.

The main object of this invention is to show that the improvements set forth in my application, Serial Number 744,598, filed September 18, 1934, now a patent for an Electric incandescent high pressure gas lamp, Patent Number 2,097,679, patented November 2, 1937, are adaptable to introduce and retain high pressure gas and liquids within small electric incandescent high pressure gas metallic vapor lamps.

A further object is that this invention shall be a continuation of my earlier invention now a patent for an Electric incandescent high pressure gas lamp, Patent Number 2,097,679, patented November 2, 1937.

A further object is that the small electric incandescent high pressure gas metallic vapor lamps described herein, can be substituted for the small electric incandescent high pressure gas lamps as mounted and described in my application, Serial Number 166,347, filed September 29, 1937, Patent Number 2,137,732, patented November 22, 1938.

Other objects of this invention will appear more fully described and illustrated hereinafter.

The invention is illustrated in the accompanying drawing in which:

Fig. 1 and Fig. 2 are enlarged sectional views of two types of small electric incandescent high pressure gas metallic vapor lamps, with Fig. 1 showing a lamp with a coiled metallic vapor filament, while Fig. 2 shows a lamp with a straight metallic vapor filament. Fig. 3 is an elevation of the lamp in Fig. 1. Fig. 4 is an elevation of the lamp in Fig. 2.

Referring to Fig. 1 which is an enlarged sectional view of a double-end small electric incandescent high pressure gas metallic vapor coiled filament lamp; having two hollow metal wires 1 and 2, hermetically sealed by glass fusion into the ends of a fused quartz tube at 3 and 4, which is heated in an oxy-hydrogen flame and drawn out to a convenient length and wound into a fused quartz capillary tube 5, with an extremely small hole exhausted and filled through said hollow metal wires 1 and 2, with material to form a metallic vapor filament 6, at high pressure when electrically lighted or burned between two solid tungsten wire arcing electrodes 7 and 8, passing through said hollow metal wires 1 and 2, which are heated, swaged and cut off around the said solid tungsten wire arcing electrodes 7 and 8, to form the preliminary seals 9 and 10, after which the final seals are made by protecting in a hydrogen flame and electric welding the ends air tight with nickel welds 11 and 12, to retain said metallic vapor filament 6, within said fused quartz capillary tube 5, then the nickel welds 11 and 12, are covered with zirconium silicate plaster, made by mixing powdered zirconium silicate together with high density sodium silicate until a pasty mass is obtained, and sintered to form buttons 13 and 14, for intense heat protection; thus forming the inner pressure restraining coiled glass capillary tube assembly; then the said coiled glass capillary tube assembly is placed within an outer pressure restraining fused quartz tubular bulb 15, having two hollow metal wires 16 and 17, slipped over the said solid tungsten wire arcing electrodes 7 and 8, and hermetically sealed through the wall of the said fused quartz tubular bulb 15, at 18 and 19, by glass fusion; after which the small inside volume 20, is exhausted and filled with high pressure gas through the said hollow metal wires 16 and 17, which are then heated, swaged and cut off around the said solid tungsten wire arcing electrodes 7 and 8, to form the preliminary seals 21 and 22, after which the said solid tungsten wire arcing electrodes 7 and 8, are cut off to any suitable length for electrical connections and the final seals are made by protecting in a hydrogen flame and electric welding the ends air tight with the nickel welds 23 and 24, to retain the high pressure gas within the said outer bulb 15.

Referring to Fig. 2 which is an enlarged sectional view of a double-end small electric incandescent high pressure gas metallic vapor straight filament lamp; having two hollow metal wires 25 and 26, hermetically sealed by glass fusion into the ends of a fused quartz tube at 27 and 28, which is heated in an oxy-hydrogen flame and drawn out to a convenient length fused quartz capillary tube 29, with an extremely small hole exhausted and filled through the said hollow metal wires 25 and 26, with material to form a metallic vapor filament 30, at high pressure when electrically lighted or burned between the ends of the said hollow metal wires 25 and 26, which are heated and flattened to form the preliminary seals 31 and 32, with openings 33 and 34, cut into the hollow center passage of said hollow metal wires 25 and 26, after which the final seals are made by protecting in a hydrogen flame and electric welding the edge of the said openings 33 and 34, air tight with nickel welds 35 and 36, to retain said metallic vapor filament 30, within said fused quartz capillary tube 29; thus forming the inner pressure restraining straight glass capillary tube assembly; then the said straight glass capillary tube assembly is placed within an outer pressure restraining fused quartz tubular bulb 37, having the said hollow metal wires 25 and 26, hermetically sealed through the wall of the said fused quartz tubular bulb 37, at 38 and 39, by glass fusion; after which the small inside volume 40, is exhausted and filled with high pressure gas through the said hollow metal wires 25 and 26, which are then heated, flattened and cut off to any suitable length for electrical connections to form the preliminary seals 41 and 42, after which the final seals are made by protecting in a hydrogen flame and electric welding the ends air tight with the nickel welds 43 and 44, to retain the high pressure gas with the said outer bulb 37.

Fig. 1 shows the applications of one type of hollow metal wire, while Fig. 2 shows another type of hollow metal wire construction, and it is obvious that the coiled capillary tube 6, or the straight capillary tube 29, could be used with either type of hollow metal wire seal construction with satisfactory results. It is my intention that the electric lamp shown in Fig. 1 shall be used for intenser light source purposes than the electric lamp shown in Fig. 2; however either lamp may be used in place of the other if so desired.

A practical means of coiling the inner fused quartz capillary tube 5, in Fig. 1 can be accomplished after it is drawn out to the proper length, by winding the capillary tube upon a tungsten mandrel while heating in a oxy-hydrogen flame; after the coiling is finished, the mandrel can be dissolved by acid or in a hot sodium nitrate bath. Any metal or any other material that will withstand the high temperature can be used as a mandrel for coiling the glass capillary tube. In some lamps it may be advisable to use a fused quartz rod or tube as a mandrel for coiling the glass capillary tube, which can be left permanently within the glass capillary tube and the ends bent to act as supports within the outer glass bulb to prevent the capillary tube from sagging to touch the outer bulb. If a metal tube mandrel was left within the coiled capillary tube, light from the opposite side would be shielded from passing through the center of the coil by such mandrel; however this may not be objectionable in some lamps.

In the small electric incandescent high pressure gas metallic vapor lamps shown and described herein, as the metallic vapor filament is electrically lighted or burned, its temperature rises and heats the glass capillary tube which in turn heats the high pressure gas surrounding it; this heat makes the gas pressure rise to still higher pressures until a maximum pressure is reached when the heat dissipated by the metallic vapor filament is equal to the heat dissipated by the external surface of the outer pressure restraining glass bulb. This higher gas pressure surrounding the glass capillary tube permits the metallic vapor filament to burn at higher temperatures and in turn make a higher metallic vapor pressure. The higher the metallic vapor filament pressure, the higher the metallic vapor filament temperature. The higher the metallic vapor filament temperature, the greater the lighting efficiency of such small electric incandescent lamp. The principal limiting factors of the maximum metallic vapor filament pressures attained within the glass capillary tube is governed by the maximum gas pressure safely used within the outer pressure restraining glass bulb, the melting and plastic temperature of the glass, the strength of the glass, the dimensions of the inner glass capillary tube, and the dimensions of the outer glass bulb.

In the small electric incandescent high pressure gas metallic vapor lamps described herein, the luminous flux from the said lamps are both incandescent light and luminescent light. While incandescent light is generally accepted to be due to temperature alone, luminescent light is not so clearly defined; however it does seem to be accepted as any light which in a strict sense is not incandescent light. The capillary tube gives off light by only incandescence, and the metallic vapor filament within the capillary tube gives off light by both incandescence and luminescence.

The inner pressure restraining metallic vapor filament glass capillary tube shall be made from a hard glass of high plastic and melting temperature, with relatively thick walls, and small capillary hole; combined for a purpose which permits such capillary tube to hold a quantity of metallic vaporizing material in the form of a metallic vapor filament at extremely high pressures, without distorting its shape or bursting when the vapor filament is electrically lighted or burned at a bright incandescence.

The small electric incandescent high pressure gas metallic vapor lamp bulb is preferably made from a hard glass of high plastic and melting temperature, with relatively thick walls, small inside volume, and short radii dimensions; combined for a purpose which permits such lamp bulb to hold gas at extremely high pressure, without distorting its shape or bursting when the inner pressure restraining glass capillary tube with a metallic vapor filament is electrically lighted or burned therein.

The high pressure gas within the outer thick wall pressure restraining glass bulb shall be used to carry heat away from, and to exert an inward pressure to counteract the outward exerted pressure, all around the inner pressure restraining glass capillary tube as the high pressure metallic vapor filament is electrically lighted or burned therein.

The hollow metal wires shall be especially used; to admit, seal, and retain the high pressure gas within the outer pressure restraining glass bulb; and to admit, seal, and retain the metallic vaporizing material within the inner pressure restraining glass capillary tube. When two hollow metal wires are used for filling purposes, the high pressure gas or the metallic vaporizing material can be flushed through the bulb or tube in and out simultaneously; one hollow metal wire being the inlet passage, while the other hollow metal wire serves as the outlet passage; the flushing gas or material drives out the air and filling gas or material drives out the flushing gases, which makes it possible to fill high pressure gas into the outer glass bulb, or fill metallic vaporizing material into the inner glass capillary tube without actually exhausting the air and flushing gases with pumping vacuum equipment.

The small electric incandescent high pressure gas metallic vapor lamps described herein, can be used for searchlight lamps, motion picture projection lamps, photographic lamps, or any other lamp where an extremely bright or intense light source is needed. When a lamp is needed for very intense light source purposes such as a powerful searchlight, the high pressure gas within the outer pressure restraining glass bulb can be circulated through the bulb in and out simultaneously through the hollow metal wires which are connected to a suitable high pressure gas cooling device where the gas is cooled and again returned through the bulb; also the lamp can be mounted within a series of additional pressure restraining glass cooling tubes, each within the other with the lamp within the center most tube, and liquid or gaseous cooling media can be circulated through each tube in a gradient high pressure arrangement, so that the outer tube has the least high pressure and the center most tube has the greatest high pressure for the cooling media circulating through them; in a lamp operated by this arrangement of cooling, intensities of the high pressure metallic vapor filament can be built up to an estimated pressure of approximately fifty thousand pounds per square inch absolute pressure, and will operate on voltages of three thousand to four thousand volts with one-half to one ampere of electric current, and when used with an efficient searchlight reflector approximately six feet in diameter, the estimated apex beam candle power would be approximately three billion candlepower.

It is old in the art that fused quartz can be heated to a bright incandescence just like a limelight, and also can withstand great thermal shock, which has lead many experimentors into attempting to apply these properties in making electric incandescent lamps. Even back over thirty years ago, when carbon filament lamps had their biggest markets, inventors had fused quartz around carbon filaments, and had also made fused quartz capillary tubes which were packed full of carbon black, liquid metals, and numerous other materials, in attempts to make incandescent lamps; but they always ran into the difficulties of getting a gas tight joint for the electric lead-in wires.

When the fused quartz mercury arc lamp was developed, a method was found whereby electric lead-in wires could be introduced into a fused quartz bulb by making what is known as a graded seal, which is made as follows:

Certain types of hard glass, such as is made with boron derivatives, (one of which is marketed under the branded trade name of "Pyrex") can be hermetically sealed with lead-in wires made from tungsten, molybdenum, platinum, and several other metals or alloys; fused quartz in a molten state can be mixed with this hard glass in all proportions; now by making a gradient series of different glasses in the form of glass particles or spun glass fibers, arranged with fused quartz at one end and the said hard glass at the other end of the gradient, the glass particles or fibers can be fused together to make a convenient length section which can be sealed to the fused quartz bulb at the fused quartz end and hermetically sealed around the said lead-in wires at the hard glass end of said section; thus making the graded seal.

Whenever the words "graded seal" are herein referred to, they are intended to mean a graded seal similar to that which is described in the preceding paragraph.

To make a good graded seal is a tedious task and requires much skill; therefore it is expensive, and its cost makes it almost prohibitive to manufacture in a low priced electric lamp.

I have been successful in developing a lead-in wire that can be hermetically sealed in practically pure fused quartz which is made as follows:

A tungsten rod is drilled out, bored out, or otherwise manufactured into a hollow metal wire or tube; then it is turned or ground down on its outside diameter until a very thin wall is obtained; then it is highly polished on its outside surface; then by chromium plating it in just the right amount on the polished surface, it can be hermetically sealed through the wall of a fused quartz bulb or tube. The thinner the wall of the hollow metal wire, the better it will hermetically seal with the fused quartz. When the hollow metal wire has an extremely thin wall so that it will not carry sufficient electric current for the lamp filament, it is sometimes necessary to insert a solid tungsten wire through the bore of the hollow metal wire to increase the electric current carrying capacity; this solid wire or an additional hollow metal wire if so desired, is made enough smaller than the bore of the hollow metal wire hermetically sealed into the fused quartz, to permit gases or liquids to be forced into a fused quartz lamp bulb around the solid wire through the hollow metal wire. Other materials can be substituted for the tungsten in making the hollow metal wire such as molybdenum, tantalum, platinum, osmium, iridium, and other metals or alloys with a very low thermal expansion coefficient that can withstand the high temperature and will wet or cohere with fused quartz; it being understood however that the hollow metal wire must have a thin wall, and that any method whereby a very thin wall hollow metal wire can be made would be satisfactory. When the end of the hollow metal wire is hermetically sealed into the fused quartz capillary tube, the hollow metal wire can be tapered off so as to make the thin wall as thin as practical near the inside end, and leave a thicker wall outside of the capillary tube to withstand the internal high pressure exerted by the metallic vapor filament when electrically lighted or burned.

Whenever the words "hollow metal wires" are herein referred to, they are intended to mean a hollow metal wire or tube similar to that hollow metal wire which is described in the preceding paragraph; or similar to that metal tubing which is described in the invention of John S. Van Horne, Patent Number 1,644,002, patented October 4, 1927; or similar to the high pressure gas restraining hollow metal wire described in my invention application Serial Number 744,598, filed September 18, 1934, now a patent for an Electric incandescent high pressure gas lamp, Patent Number 2,097,679, patented November 2, 1937.

Whenever the words "fused quartz" or "hard glass" or "glass" are herein referred to, they are intended to mean any vitreous material made into glass; or any glassy material made from quartz or pebble base with other materials added to make glass; or any glass which is known as fused quartz or fused pebble, sometimes marketed as a thermal-shock resisting glass. In glass technology, quartz, sometimes called pebble or silica sand, but chemically known as silicon dioxide, is the basic material of glass; it is combined in a molten state with various amounts of oxides, carbonates, colloids, salts, etc., from many chemicals to make a wide variety of glasses in many different grades from the softest to the hardest types of glass known in the art. Even quartz or pebble becomes glass, once it has been fused; the fusing destroys its natural lamular crystallographical structure, and while it has been changed optically in relation to certain light polarizing effects, it is still unchanged in respect to many of its original properties, but optically it becomes glass; therefore, strictly speaking, quartz is natural pebble having a lamular structure but fused quartz is glass.

Whenever the words "metallic vapor" or "metallic vapor filament" or "filament" are herein referred to, they are intended to mean any material which can be retained in a vaporous or gaseous state within a glass capillary tube by burning or heating said material electrically to a vaporizing temperature and developing a high pressure metallic vapor filament within the small bore of the said glass capillary tube; while mercury, sodium, and potassium are the lowest vaporizing metals and are preferably the material suited to fill the glass capillary tube, nevertheless, other metals or alloys can be used such as cadmium, calcium, aluminum, magnesium, or any other metal which will vaporize below the plastic temperature of the fused quartz capillary tube.

When several small electric incandescent high pressure gas metallic vapor lamps are mounted within a large lamp bulb as shown and described in my Patent Number 2,137,732, patented November 22, 1938, the metallic vaporizing material within each small lamp can be the same material or different material for each lamp with one or more having mercury, one sodium, or potassium, etc., to obtain a fuller band spectral light from the large lamp.

Whenever the words "high pressure gas" are herein referred to, they are intended to mean any high pressure gas or any liquid which is used to fill the small electric incandescent high pressure gas metallic vapor lamps; or any high pressure gas or any liquid used within high pressure restraining glass tubes to permit an increase in the operating temperature and pressure of the metallic vapor filament retained within a small electric incandescent high pressure gas metallic vapor lamp; while the preferred gas is hydrogen, yet other gases or mixture of gases can be used effectively, such gases as argon, nitrogen, neon, krypton, xenon, helium, air or any other gas that will serve the purpose, where the said gas is at any pressure from twenty-nine pounds per square inch absolute pressure upward to the maximum safe working pressure of the pressure restraining glass bulbs or tubes holding such gas, which pressure in extremely small bulbs or tubes would be many thousand pounds per square inch absolute pressure. The reason for including liquids in this description of the high pressure gas, is that some gases will become liquids under high pressure when the lamp is not burning, such a gas as carbon dioxide; while some liquids will become gases from the heat of the lamp, such a liquid as water.

Whenever the words "hermetically sealed" are herein referred to, they are intended to mean that the outer surface is hermetically sealed for a short distance completely encircling the wire.

Whenever the words "final seal" are herein referred to, they are intended to mean that final receptacle closure seal which seals the high pressure gas or the metallic vaporizing material within in the pressure restraining glass bulb or the glass capillary tube; or that external terminal seal formed by closing the center opening within the hollow metal wire air tight.

When it is necessary to make the thickness of the hollow metal wire wall great enough to withstand extremely high pressure and the wall thickness is too great to permit it to be hermetically sealed within a high pressure restraining fused quartz bulb or fused quartz capillary tube, then the graded seal can be used to hermetically seal in such thick wall hollow metal wire.

In some of the small electric incandescent high pressure gas metallic vapor lamps which can be manufactured with the improvements of this invention, it is not necessary to use pure fused quartz to make the glass capillary tube or the tubular bulb in order to obtain the results desired; therefore a manufactured heat resisting glass can be substituted for the fused quartz to make the glass capillary tube or the tubular bulb which will hermetically seal with a hollow metal wire having a thick wall. I have found that it is necessary to depart only slightly from pure fused quartz to make a glass that will hermetically seal with a hollow metal wire having a slightly thicker wall.

I am aware that prior to my invention, fused quartz capillary tube lamps have been built with more or less degree of success, and it is obvious that the improvements of this invention can be used to build many electric lamps other than those lamps described herein; therefore in anticipation of the manufacture of such lamps, it is my desire to extend the claims of this invention to include any electric lamp which uses any of the improvements described or claimed herein.

I claim:

1. A combination conductor final seal tubulation, for an electric incandescent metallic vapor filament capillary tube, consisting of, a hollow metal wire fluid pressure filling tube hermetically sealed into the bore end of said filament tube, a high temperature heat resisting electric conductor lead-in wire electrode being inserted into said filament tube through said hollow metal wire, a final seal being said hollow metal wire closed air tight around said electrode near the external end.

2. A metallic vapor filament capillary tube for an electric lamp, consisting of, an helical wound glass capillary tube, hollow metal wires hermetically sealed into the bore ends of said capillary tube, high temperature heat resisting electrodes being inserted into the bore ends of said capillary tube through said hollow metal wires, metallic vaporizing material in said capillary tube, final seals being said hollow metal wires closed air tight around said electrodes near the external ends.

3. An electric incandescent high pressure gas metallic vapor lamp, having an enclosed metallic vapor filament capillary tube, consisting of, an helical wound glass capillary tube having metallic vaporizing material therein, hollow metal wires hermetically sealed into the bore ends of said capillary tube, high temperature heat resisting extended electrodes inserted into the bore ends of said capillary tube through said hollow metal wires, final seals of said capillary tube being said hollow metal wires closed air tight around said electrodes, said capillary tube inserted within a glass bulb, consisting of, a high pressure resisting glass bulb having relatively thick walls with small inside volume and short inside radii dimensions, and having hollow metal wires hermetically sealed through the walls with said electrodes extending therefrom, gas under high pressure in the interspace of said bulb surrounding said capillary tube, final seals of said bulb being said hollow metal wires closed air tight around said extended electrodes from said capillary tube.

4. The combination, with an electric lamp, of a glass capillary tube having metallic vaporizing material hermetically sealed therein by means of hollow metal wires, a glass bulb having relatively thick walls with small inside volume and short inside radii dimensions, said capillary tube inserted within said bulb with high pressure gas hermetically sealed into the interspace by means of hollow metal wires.

5. The method of constructing a gaseous electric conduction device, comprising, sealing a metal tube to one end of a glass tube, sealing a conducting member to the other end of the glass tube, exhausting and filling the glass tube through said metal tube, forming a gas tight constriction in said metal tube near the seal and perforating the wall of the metal tube between the constriction and its outer end, placing the glass tube within a second glass tube, sealing the second glass tube to the metal tube between its end and perforation, closing the opposite end of the second glass tube, exhausting and filing the interspace between glass tubes through the metal tube, and sealing off the metal tube.

6. A gaseous conduction device, comprising, a glass bulb having relatively thick walls, electric leads consisting of two hollow metal wires hermetically sealed through the end walls of said bulb and sealed into and supporting a glass capillary tube within said bulb, said capillary tube containing a vaporizable metal, hermetic constrictions in the hollow leads sealing off said capillary tube, a perforation in the wall of at least one of the hollow leads communicating with the tube to bulb interspace.

7. A gaseous conduction device, comprising, a glass bulb having relatively thick walls, electric leads consisting of two hollow metal wires hermetically sealed through the end walls of said bulb and sealed into and supporting a glass capillary tube within said bulb, said capillary tube containing a vaporizable metal in sufficient quantity to support a high pressure arc, hermetic constrictions in the hollow leads sealing off said capillary tube, a perforation in the wall of at least one of the hollow leads communicating with the tube to bulb interspace, and hermetic sealing constrictions in the hollow leads exterior to the bulb.

8. The method of constructing an electric metallic vapor lamp, comprising, sealing hollow metal wires into both ends of a glass capillary tube, exhausting and filling metallic vaporizing material into said glass capillary tube through said hollow metal wires, forming gas tight final seals and perforating the walls between said final seals and the outer ends in said hollow metal wires, placing the glass capillary tube within a pressure restraint glass bulb, sealing said bulb to said hollow metal wires between the outer ends and the perforations.

9. An electric incandescent high pressure gas metallic vapor lamp, comprising, a glass bulb having relatively thick walls, electric leads consisting of two hollow metal wires hermetically sealed through the walls of said bulb and sealed into and supporting a glass capillary tube containing a metallic vaporizing material and gas in sufficient quantity to maintain a high pressure vapor electric arc, hermetic constructions in said hollow metal wires sealing off said capillary tube, perforations in the walls of said hollow metal wires communicating to interspace of said bulb, high pressure gas within said intrespace and final seals in said hollow metal wires exterior to said bulb.

HAROLD SWANSON.